UNITED STATES PATENT OFFICE.

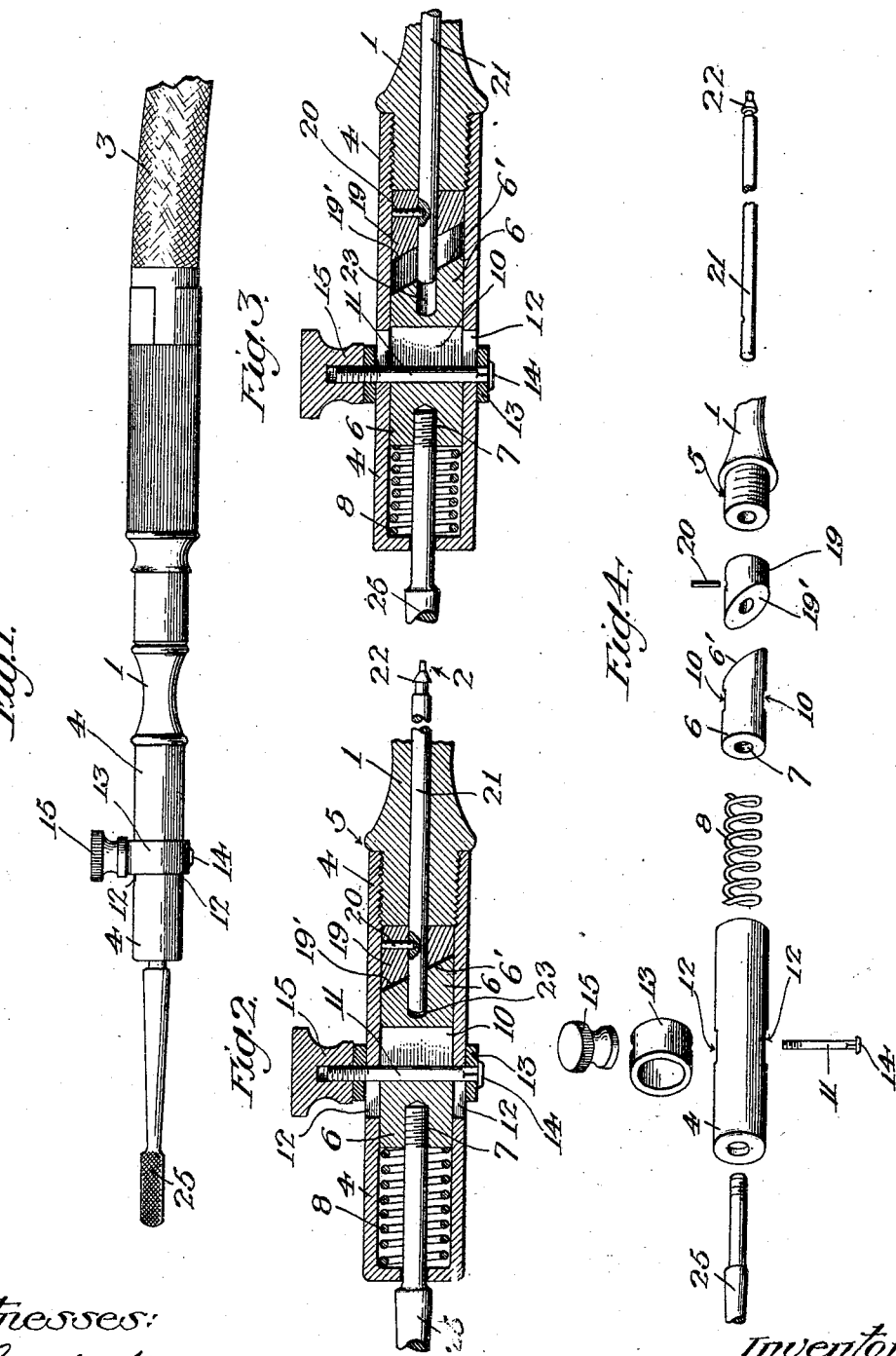

TIMOTHY MAHONEY, OF LOS ANGELES, CALIFORNIA.

DENTAL TOOL.

933,718.  Specification of Letters Patent.  Patented Sept. 7, 1909.

Application filed September 3, 1908. Serial No. 451,610.

*To all whom it may concern:*

Be it known that I, TIMOTHY MAHONEY, a citizen of the United States, residing at Los Angeles, in the county of Los Angeles and State of California, have invented a new and useful Dental Tool, of which the following is a specification.

This invention relates to a dental tool which is adaptable for use in any of the several dental operations in which a reciprocating movement is required, for example, in plugging, filing or cleaning.

The main object of the present invention is to provide a tool which will produce a smooth reciprocating motion without the violent jar or shock produced by those tools wherein the effective stroke is produced by spring action on release from the operating means.

Another object of the invention is to provide for varying the length of the stroke.

In the accompanying drawings: Figure 1 is a side elevation of the tool. Fig. 2 is a longitudinal vertical section showing the adjustment of the tool for maximum stroke. Fig. 3 is a longitudinal section showing the adjustment of the tool for minimum stroke. Fig. 4 is a perspective showing the various parts of the tool separate from one another, these parts comprising a mechanism intermediate between the driving means and the instrument.

The tool comprises a shank 1 adapted for attachment by a coupling 2 to the end of an ordinary flexible cord 3; a tubular casing 4 detachably connected to shank 1 by a screw coupling 5; an instrument carrier 6 mounted to reciprocate within the sleeve 4; a cam mechanism for moving the said carrier to advance or project the instrument; and a spring means for returning the carrier to withdraw or retract the instrument.

The carrier 6 consists of a cylindrical block sliding within the tubular casing 4, a retracting spring 8 being arranged within the sleeve and between this carrier block and the forward end of the member 4. Means are provided for attachment of a dental instrument, such as a file, plugger, or scraper, to the carrier block, said means consisting, for example, of a tapped hole 7 in said block to receive the shank of such instrument. Said carrier block has a transverse slot 10, through which passes a cross bolt or pin 11 which extends through side slots 12 in the casing 4 and through a ring 13 surrounding said casing, one end of this cross bolt having a head 14 and the other end being screw threaded to receive a nut 15 by which the bolt is clamped to the ring. Said ring is made sufficiently thin to enable this clamping action to bind the ring on the casing 4 and thereby bind the cross bolt in place, enabling it to serve as a stop for the retractile movement of the carrier.

The rear end or face 6' of the carrier block 6 is beveled or formed at an inclination to the longitudinal axis of the block so as to form an element of the cam mechanism, whose coöperating element consists of a cam member 19 secured by a pin 20 on the driving shaft 21 which passes axially through the shank 1 and is provided at its end with a clutch member 22 so as to be engaged and driven by the usual rotative driving member in the flexible cord 3. The forward face 19' of cam member 19 is beveled at a similar angle to the rear face of the carrier block 6. The two opposing faces of the cam member 19 and the carrier block 4 coöperate, in the rotation of the cam member relatively to the carrier block, to alternately force the carrier block forward against the pressure of spring 8 and to allow the carrier block to be retracted by the action of said spring. In order to hold the two parts of the cam mechanism in axial alinement with minimum friction, shaft 21 extends forward of the cam member into socket 23 in the rear end of the carrier block.

The operation is as follows: A suitable instrument, for example, a file, indicated at 25, or a plugging tool, or a cleaning tool, having been inserted and secured in the carrier block 4, and power being applied to rotate the shaft 21, the cam member 19 is thereby rotated and by engagement of its face 19' with the inclined face 6' of block 6, it drives the instrument carrier 6 forward, said carrier being held from rotation by bolt 11, projecting the instrument 25 with a smooth positive stroke, which is without jar or shock and simulates the action of the hand in manual operation. After the cam faces pass the position shown in Fig. 2, the spring 8 returns or retracts the carrier and withdraws the instrument and this action is also smooth and free from jar the cam being of such shape that it resists and retards the motion on the back stroke under the action of the spring. In other words the cam surfaces are continually in contact and the tool is at no time left free for violent reaction under the influence of the spring. The operator by grasping the outside of the shank and the tubular casing affords an abutment against which the reaction of the device is executed, and the projection of the instrument therefore presents the same kind of pressure in plugging, for example, as would be given by a manual push.

In case it is desired to limit the stroke of the instrument, or to provide for less than a full stroke, the cross bolts 11 may be moved forward and fastened in the position shown in Fig. 3, or in an intermediate position, limiting the retractable movement of the carrier block, and thus shortening the distance which the block and instrument are moved by the operation of the cam, the cam member 19 in the case making a part of its rotation without contact with the cam member 6', as indicated by the clearance in Fig. 3. Thus in using the tool for cleaning, an extremely short stroke may be given, which is of advantage in certain cases.

What I claim is:

1. A dental tool, comprising a shank, a tubular casing, a shaft rotatable in the shank member, a cam member on said shaft having a cam face at its end, an instrument carrier slidable in the tubular casing and having a cam face coöperating with the cam face of aforesaid cam member to cause projection of the instrument, the said cam faces being shaped to continually interengage so that the movement of the instrument carrier is smoothly controlled during the forward and backward stroke by the rotation of the cam, a spring for pressing said carrier to cause retraction of the carrier, and means for preventing rotation of the carrier.

2. A dental tool, comprising a shank, a tubular casing, a shaft rotatable in the shank member, a cam member on said shaft having a cam face at its end, an instrument carrier slidable in the tubular casing and having a cam face coöperating with the cam face of aforesaid cam member to cause projection of the instrument, the said cam faces being shaped to continually interengage so that the movement of the instrument carrier is smoothly controlled during the forward and backward stroke by the rotation of the cam, a spring for pressing said carrier to cause retraction of the carrier, means for preventing rotation of the carrier, consisting of a bolt extending across the tubular casing, said bolt having screw means to clamp the same in position, the carrier being slotted to receive the bolt and allow of longitudinal movement of the carrier, and the casing being slotted to receive the bolt and allow of longitudinal adjustment of the bolt relatively to the casing.

3. A dental tool, comprising an instrument carrier, a support therefor, means for causing projection of the carrier by positive cam action, means for causing the retraction of the carrier and means for smoothly retarding the retraction of the carrier.

4. A dental tool, comprising an instrument carrier, a support therefor, means for causing projection of the carrier by positive cam action, cam means for retarding retraction of the carrier, means for causing the retraction of the carrier, and means for adjustably limiting the retractile movement of the carrier.

5. A dental tool comprising a shank, a tubular casing, a shaft rotatable in the shank member, a cam member on said shaft having a cam face at its end, an instrument carrier slidable in the tubular casing and having a cam face coöperating with the cam face of aforesaid cam member to cause projection of the instrument, a spring for pressing said carrier to cause retraction of the carrier, means for preventing rotation of the carrier, consisting of a bolt extending across the tubular casing, said bolt having screw means to clamp the same in position, the carrier being slotted to receive the bolt and allow of longitudinal movement of the carrier, and the casing being slotted to receive the bolt and allow of longitudinal adjustment of the bolt relatively to the casing.

In testimony whereof, I have hereunto set my hand at Los Angeles, California this 27th day of August 1908.

TIMOTHY MAHONEY.

In presence of—
ARTHUR P. KNIGHT,
FRANK L. A. GRAHAM.